United States Patent [19]
Desmaret

[11] 4,407,012
[45] Sep. 27, 1983

[54] MULTI-DIRECTIONAL LIGHT SOURCE

[75] Inventor: Jean-Pierre Desmaret, Drancy, France

[73] Assignee: Regie Nationale des Usines Renault, Boulogne-Billancourt, France

[21] Appl. No.: 341,138

[22] Filed: Jan. 20, 1982

[30] Foreign Application Priority Data

Jan. 20, 1981 [FR] France ................. 81 00938

[51] Int. Cl.³ ................................ F21V 7/04
[52] U.S. Cl. .................... 362/32; 33/281;
33/285; 356/138; D10/66; 362/311; 362/326; 362/351
[58] Field of Search .............. 362/32, 326, 351; 33/290, 281, 285; D10/66; 356/138

[56] References Cited

U.S. PATENT DOCUMENTS

| | | | |
|---|---|---|---|
| 3,018,362 | 1/1962 | Joyce | 240/10 |
| 3,439,157 | 4/1969 | Myles | 362/32 |
| 3,644,725 | 2/1972 | Lochridge | 362/32 |
| 3,813,514 | 5/1974 | Canty | 219/354 |
| 4,060,722 | 11/1977 | Foley | 362/32 |
| 4,097,917 | 6/1978 | McCaslin | 362/32 |

OTHER PUBLICATIONS

"Applied Optics", vol. 17, No. 10, p. 2469 (1978).

*Primary Examiner*—Stephen J. Lechert, Jr.
*Attorney, Agent, or Firm*—Oblon, Fisher, Spivak, McClelland & Maier

[57] ABSTRACT

A multi-directional light source includes a ground ball made from non-expanded polystyrene, fitted and glued to the clear extremity of an optical fiber contained inside a rigid metal tube and an outer plastic body tooled after being moulded.

4 Claims, 4 Drawing Figures

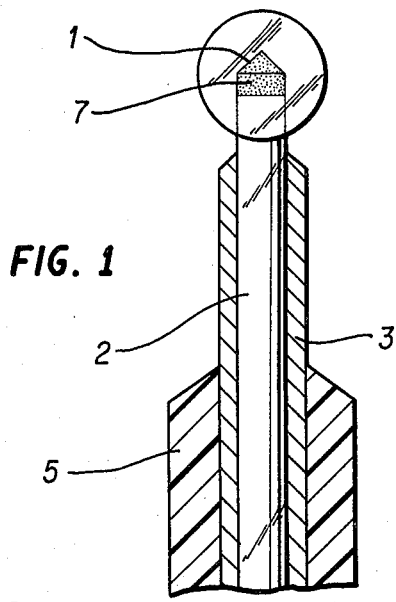
FIG. 1
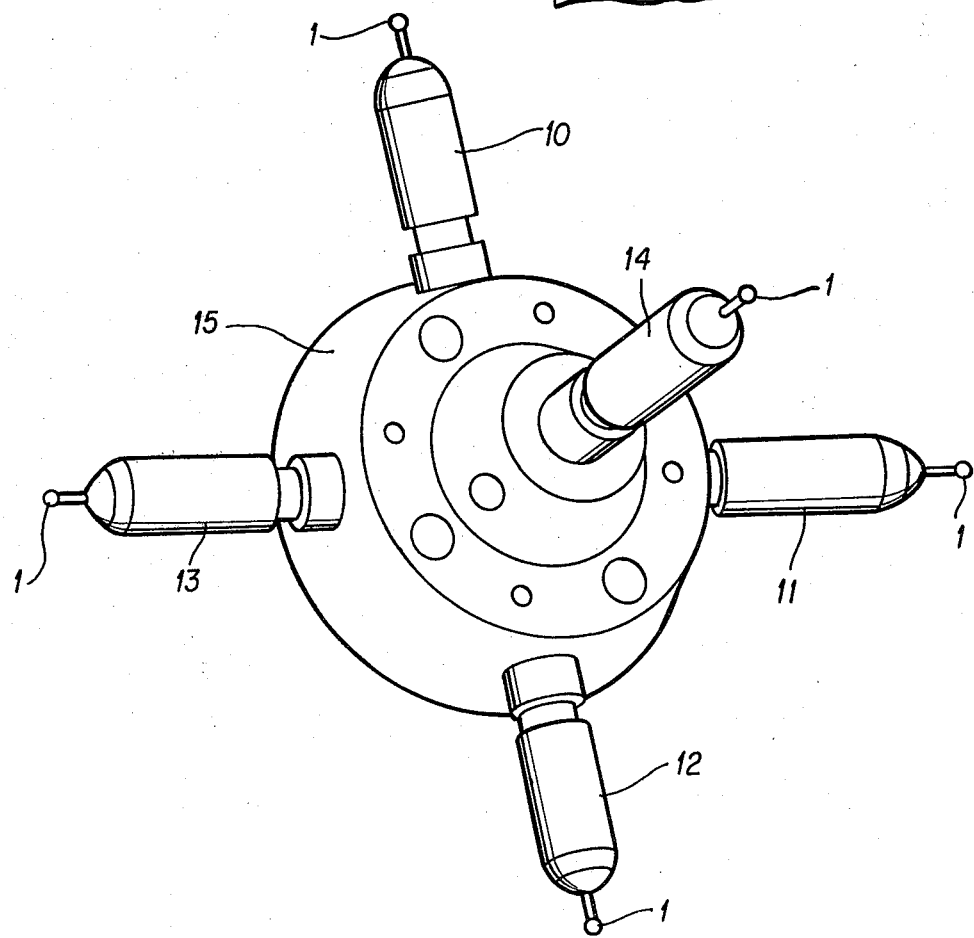

MULTI-DIRECTIONAL LIGHT SOURCE

BACKGROUND OF THE INVENTION

1. Field of the Invention

This invention concerns radiant, pinpoint energy sources and especially the creation of pinpoint light targets used in optical metrology in the field of three-dimensional measurements with the assistance of theodolites.

2. Description of the Prior Art

Any surface or volume that emits radiation represents a radiant energy source. This source is considered to be pinpoint if its size is extremely small in relation to the distance that separates it from the receiver or observer.

The implementation or manufacturing demands for the current systems require that the following compromise be abided by:

When the source is considered to be pinpoint, it has the disadvantage that it radiates only within an extremely small solid angle; increasing this solid angle requires increasing the size of the source such that it cannot be considered to be pinpoint any longer. This invention enables one to avoid these disadvantages.

SUMMARY OF THE INVENTION

The basic multi-directional light source according to this invention includes an optical fiber located along at least part of its length inside a thin rigid metal tube, and a ground ball made from a substance that can transmit light rays in a determined range of wavelengths, fitted and glued to the clear extremity of said optical fiber.

According to a preferred embodiment, the ground ball, which is made from non-expanded polystyrene, has a diameter of about 0.5 mm while the diameter of the optical fiber equals about 0.2 mm.

According to a second feature thereof, this invention concerns a composite multi-directional light source including five of the above basic light sources in which four of those basic sources are located in a plane defined by two axes with rectangular coordinates and in which the fifth basic source is arranged on an axis perpendicular to the above coordinate axes and intersecting their intersection point.

According to a third feature of this invention, the basic or composite multi-directional light source is used in the measurement of the position and direction of the extremity of a multi-articulated unit such as a robot. The above measurement is carried out with the use of two theodolites.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 shows a section, enlarged 40 times, of an embodiment of a basic multi-directional light source according to this invention;

FIG. 2 shows in perspective a composite multi-directional light source which includes five basic light sources according to this invention;

DETAILED DESCRIPTION OF THE PREFERRED EMBODIMENTS

According to the embodiment of FIG. 1, which shows in section and enlarged about 40 times, a basic multi-directional light source according to this invention, the basic light source includes a ground ball 1 made from non-expanded polystyrene with a diameter of 0.5 mm. The support for transmitting the required light flow for ball 1 radiance includes an optical fiber 2 with a 0.2 mm diameter fitted and glued at 7 to the center of ball 1. The rigidity of the optical fiber 2 is obtained by encasing the fiber within a thin peripheral metal tube 3 and a molded and machined outer plastic body 5.

Figure 3:
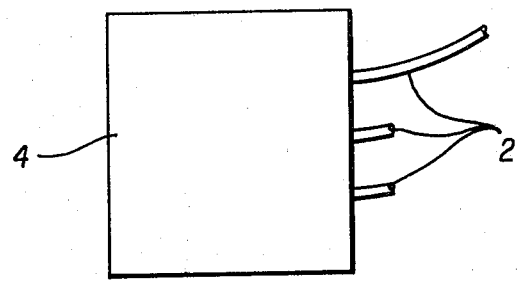
FIG. 3 schematically shows a light energy generator that can be associated with a previously mentioned multi-directional light source.

A light energy generator 4 which can be connected to the multi-directional light source of FIG. 1 is schematically shown in FIG. 3. It has, according to need, one or more outlets through which the connecting optical fibers 2 run. Because the light energy generator 4 can be located at quite a distance from the ground ball 1, it can be a standard type and can offer the following advantages:

1. Power due to large size;
2. Intensity calibration in relation to specific needs;
3. Cooling;
4. Ability to feed several sources at the same time;
5. Ability to create different types of radiance, monochromatic, modulated, etc.

FIG. 2 shows in perspective another embodiment of a multi-directional light source according to this invention, or a composite multi-directional light source that includes five basic light sources 10, 11, 12, 13 and 14, each being identical to the light source illustrated in FIG. 1. Four of the sources, 10, 11, 12, and 13 are in the same plane and they are located inside said plane with two light sources on each of two rectangular coordinate axes; for instance, sources 10 and 12 are arranged along an axis XOX' and sources 11 and 13 are arranged according to an axis YOY' perpendicular to XOX'. Under such circumstances, the fifth basic source 14 is arranged along an axis OZ that forms a trirectangle trihedron with axes XOX' and YOY'. The light energy generator 4 of FIG. 3 whichfeeds the five basic light sources 10 through 14 can be easily placed inside a mobile cylindrical cup 15 that supports the five light sources.

Figure 4:
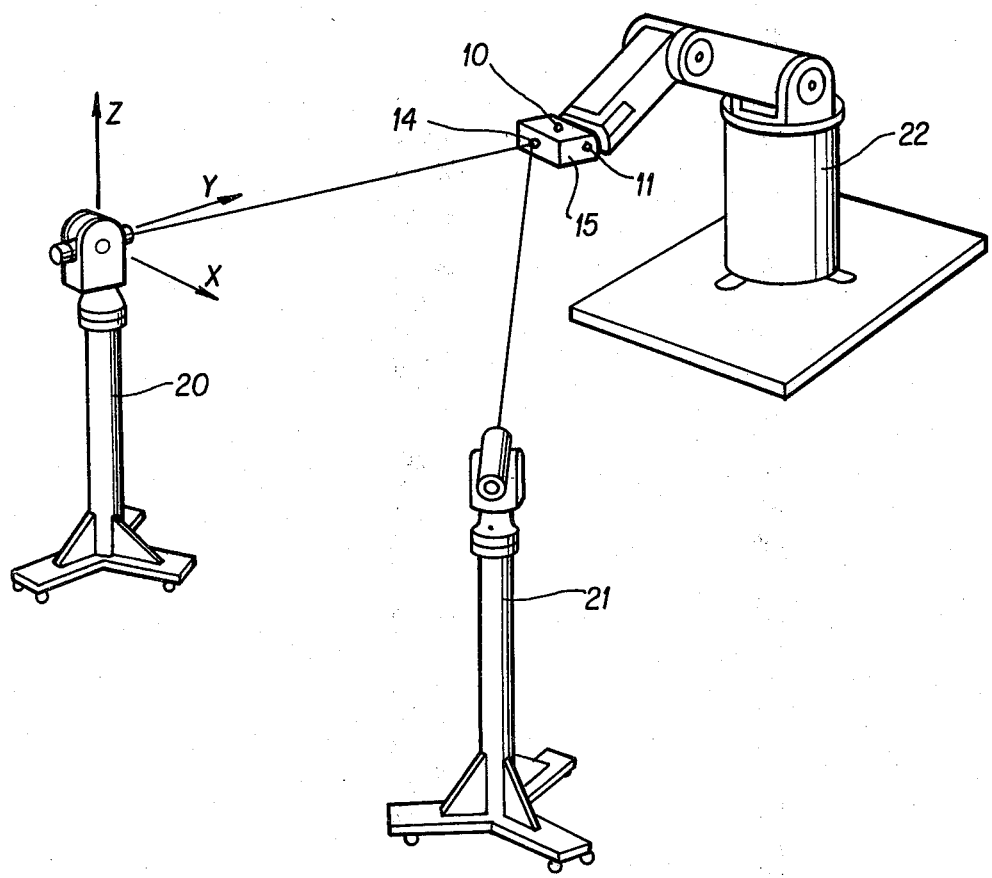
FIG. 4 illustrates a three-dimensional measurement method with two theodolites, making use of the previously mentioned multi-directional light source.

FIG. 4 illustrates a possible arrangement according to which one measures the position and direction of the extremity of a multi-articulated unit such as a robot 22. To that end, the measurement is carried out with two theodolites 20 and 21 which make it possible to calculate the position in x, y, z coordinates of a light point, such as the ball 1 of the multi-directional light source 14 borne by the mobile cup 15 and representing the extremity of the robot 22, according to the arrangement of FIG. 4.

For this undertaking, in addition to the position of the robot extremity, one must determine its direction. For this, one uses a multi-source target cup 15 with five sources, only three of which are needed for measurement. But, according to the positions of the mobile extremity cup 15, since all the zones cannot always be aimed at by the theodolites, one must increase the number of sources. A multi-source target cup 15 with five sources is perfectly satisfactory.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multi-directional light source comprising a basic light source including:
   an optical fiber having a first end communicatable with a light generator, and a second end;
   a rigid metal tube encasing a portion of said optical fiber, said portion not including said second end;
   a ball ground from a light transmitting material, said ball having a diameter greater than that of said optical fiber, said ball being fixed to said second end of said fiber,
   whereby light from said light generator is transmitted through said optical fiber and through said ball, further comprising a composite light source including five of said basic light sources wherein four of said basic light sources are located in a plane defining two rectangular coordinate axes, one of said basic light sources being positioned on each said coordinate axis on each side of the point of intersection of said axes, and wherein a fifth said basic light source is located on a third coordinate axis perpendicular to said two rectangular axes and intersecting said point of intersection.

2. The light source of claim 1 mounted in the distal end of a multi-articulated unit, and two theodolites mutually spaced from said multi-articulated unit.

3. A multi-directional light source comprising a basic light source including:
   an optical fiber having a first end communicatable with a light generator, and a second end;
   a rigid metal tube encasing a portion of said optical fiber, said portion not including said second end;
   a ball ground from a light transmitting material, said ball having a diameter greater than that of said optical fiber, said ball being fixed to said second end of said fiber,
   whereby light from said light generator is transmitted through said optical fiber and through said ball;
   wherein said light source is mounted in the distal end of a multi-articulated unit, and two theodolites mutually spaced from said multi-articulated unit.

4. A multi-directional light source comprising a basic light source including:
   an optical fiber having a first end communicatable with a light generator, and a second end;
   a rigid metal tube in close surface contact with a portion of said optical fiber along the length of said fiber, said portion extending adjacent to said second end;
   a ball ground from a light transmitting material, said ball having a diameter greater than that of said optical fiber, said ball being fixed to said second end of said fiber,
   whereby light from said light generator is transmitted through said optical fiber and through said ball, wherein said ball is formed of non-expanded polystyrene, wherein the diameter of said ball is 0.5 mm and wherein the diameter of said fiber is 0.2 mm, whereby movement of said fiber relative to said tube is prevented.

* * * * *